United States Patent

Yamada et al.

(10) Patent No.: US 6,898,027 B2
(45) Date of Patent: May 24, 2005

(54) OPTICAL ELEMENT AND MANUFACTURING METHOD FOR SAME

(75) Inventors: Masahiro Yamada, Kanagawa (JP); Takahiro Miura, Kanagawa (JP); Takakiyo Kanazawa, Kanagawa (JP); Tetsu Watanabe, Tokyo (JP); Sunao Aoki, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/470,760

(22) PCT Filed: Dec. 4, 2002

(86) PCT No.: PCT/JP02/12712

§ 371 (c)(1),
(2), (4) Date: Jul. 31, 2003

(87) PCT Pub. No.: WO03/048816

PCT Pub. Date: Jun. 12, 2003

(65) Prior Publication Data

US 2004/0075915 A1 Apr. 22, 2004

(30) Foreign Application Priority Data

Dec. 4, 2001 (JP) .................................. 2001-370447

(51) Int. Cl.$^7$ ............................ G02B 9/00; G02B 9/08; B29D 11/00
(52) U.S. Cl. ..................... 359/796; 359/738; 264/1.7
(58) Field of Search ............................. 359/620, 642, 359/661, 665, 738, 741, 756, 796; 264/1.7

(56) References Cited

U.S. PATENT DOCUMENTS

| | | | |
|---|---|---|---|
| 4,309,078 A | 1/1982 | Hara et al. | |
| 5,452,384 A | * 9/1995 | Kurita et al. | 385/33 |
| 5,844,290 A | * 12/1998 | Furumiya | 257/432 |
| 6,066,511 A | * 5/2000 | Fukusyo | 438/60 |
| 6,606,135 B2 | * 8/2003 | Nakanishi et al. | 349/95 |
| 6,618,200 B2 | * 9/2003 | Shimizu et al. | 359/619 |

FOREIGN PATENT DOCUMENTS

| | | | |
|---|---|---|---|
| EP | 1 151 796 A2 | 7/2001 | |
| JP | 55-151601 A1 | 11/1980 | |
| JP | 03157602 A | * 7/1991 | G02B/3/00 |
| JP | 7-13005 A1 | 1/1995 | |
| JP | 11-167143 A1 | 6/1999 | |
| JP | 11-202180 A1 | 7/1999 | |
| JP | 2000-251313 A1 | 9/2000 | |
| JP | 2001-311803 A1 | 11/2001 | |

OTHER PUBLICATIONS

PCT/JP02/12712, International Search Report, Feb. 4, 2003.

* cited by examiner

Primary Examiner—David N. Spector
(74) Attorney, Agent, or Firm—Rader, Fishman & Grauer PLLC; Ronald P. Kananen

(57) ABSTRACT

An optical element and manufacturing method of the present invention prevent the incidence of light on unnecessary portions of the optical element so that stray light and noise are eliminated. The optical element is configured from at least one substrate having a plurality of lens substrates that have embedded lenses made of a material with a higher refractive index than the at least one substrate. A shielding means limits the optical path so that incident light propagates only within a prescribed optical path formed on a light incidence-side or emission-side surface of one of the lens substrates. In addition, the shielding means is formed from an absorptive or reflective film placed in a region outside the prescribed optical path or through machining the region outside the prescribed optical path.

6 Claims, 11 Drawing Sheets

OPTICAL ELEMENT AND MANUFACTURING METHOD FOR SAME

TECHNICAL FIELD

This invention relates to an optical element comprising a lens substrate, in which a high-refractive-index lens is embedded in a substrate, and a manufacturing method therefor.

BACKGROUND ART

Apertures are important components of optical pickups and other optical apparatuses which, by limiting the optical path, eliminates stray light and other external disturbances.

FIG. 14 shows the conventional configuration of an optical head using an optical element proposed in, for example, Japanese Patent Application No. 2000-132897, Japanese Patent Application No. 2000-189730, or similar.

This optical element (lens element) 70 is configured by stacking a first lens substrate 73, in which a first objective lens 71 is embedded in a transparent substrate, and a second lens substrate 74, in which a second objective lens 72 is embedded in a transparent substrate.

The first and second objective lenses 71 and 72 have higher refractive indices than the respective surrounding transparent substrates.

By means of two lenses, which are the first objective lens 71 and the second object lens 72, the light beam L converges and irradiates the optical disc 80.

In the prior art, an aperture 75 to limit the optical path is, for example, formed from a collimating lens 76 or similar formed using conventional manufacturing methods, as shown in FIG. 14. In the configuration of FIG. 14, the aperture 75 comprises a lens holder of, for example, black plastic or similar, which holds the collimating lens 76.

However, for the configuration shown in FIG. 14, when for example axis inclination of the optical path occurs due to motion in the horizontal direction of the collimating lens 76, light may be guided into regions outside the effective area of the objective lenses 71 and 72, and the guiding of light into the region within the effective area may be prevented. As a result, stray light occurs, becoming light returning to the semiconductor laser or distorting the shape of the focused spot of laser light, and as a result generating noise or causing other problems.

In order to resolve the above problems, this invention provides an optical element and manufacturing method thereof which enables the avoidance of stray light and noise, by preventing the incidence of light on unnecessary portions and by ensuring that light is not prevented from being guided to the region within the effective area.

DISCLOSURE OF THE INVENTION

An optical element of this invention comprises one or more substrates which are transparent to incident light, each comprising a lens substrate formed by embedding, in a substrate transparent to incident light, a lens of material with a higher refractive index than that of the substrate; one among the one or more substrates is formed with shielding means, in the surface of light incidence or in the surface of light emission, to limit the optical path such that incident light propagates only within a prescribed optical path through the action of either reflection, refraction, absorption, or dispersion.

By means of the configuration of the above-described optical element of this invention, shielding means to limit the optical path such that incident light propagates only within a prescribed optical path, through the action of either reflection, refraction, absorption or dispersion, is formed in the surface of light incidence or in the surface of light emission in one substrate among the one or more substrates, so that it is possible through the shielding means to shield light such that light is not incident outside the prescribed optical path (for example, outside the effective region of the lens), that is, in unnecessary portions.

A method of manufacture of an optical element of this invention is a method of formation of an optical element comprising one or more substrates, transparent to incident light, each comprising a lens substrate formed by embedding, in a substrate transparent to incident light, a lens of material with a higher refractive index than that of the substrate; having a process of formation, in one among the one or more substrates, of an absorption or reflection film in the region outside a prescribed optical path in the surface on the incidence side or on the emission side of the substrate.

A method of manufacture of an optical element of this invention is a method of formation of an optical element comprising one or more substrates, transparent to incident light, each comprising a lens substrate formed by embedding, in a substrate transparent to incident light, a lens of material with a higher refractive index than that of the substrate; having a process of machining, in one among the one or more substrates, a region outside a prescribed optical path in the surface on the incidence side or on the emission side of the substrate.

By means of the above-described methods of manufacture of an optical element of this invention, by forming an absorption or reflection film in a region outside a prescribed optical path, or by machining a region outside a prescribed optical path, in a surface on the incidence side or on the emission side of a substrate, shielding means employing an absorption or reflection film or employing machining can be formed in a region outside the prescribed optical path in the surface.

Through the shielding means, the optical path can be limited such that light is not incident in unnecessary portions outside the prescribed optical path.

BEST MODE OF CARRYING OUT THE INVENTION

Figure 1:
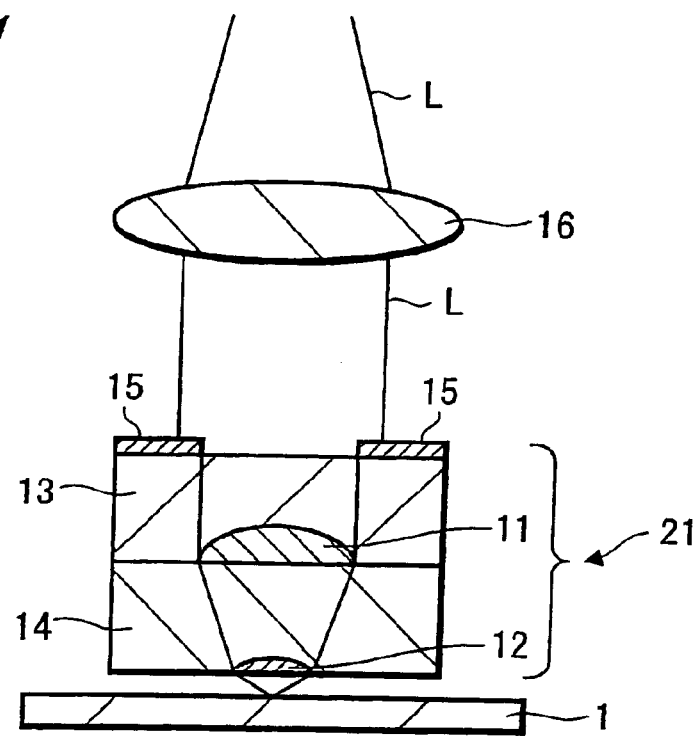
FIG. 1 is a cross-sectional view in summary of the configuration of major portions of an optical head using an optical element of this invention.

This invention relates to an optical element comprising one or more substrates which are transparent to incident light, each comprising a lens substrate formed by embedding, in a substrate transparent to incident light, a lens of material with a higher refractive index than that of the substrate; one among the one or more substrates is formed with shielding means, in the surface of light incidence or in the surface of light emission, to limit the optical path such that incident light propagates only within a prescribed optical path through the action of either reflection, refraction, absorption, or dispersion.

The above-described optical element of this invention is configured by stacking a plurality of lens substrates.

A method of manufacture of an optical element of this invention is a method of formation of an optical element comprising one or more substrates, transparent to incident light, each comprising a lens substrate formed by embedding, in a substrate transparent to incident light, a lens of material with a higher refractive index than that of the substrate; this method of manufacture of an optical element has a process of formation, in one among the one or more substrates, of an absorption or reflection film in the region outside a prescribed optical path in the surface on the incidence side or on the emission side of the substrate.

A method of manufacture of an optical element of this invention is a method of formation of an optical element comprising one or more substrates, transparent to incident light, each comprising a lens substrate formed by embedding, in a substrate transparent to incident light, a lens of material with a higher refractive index than that of the substrate; this method of manufacture of an optical element has a process of machining, in one among the one or more substrates, a region outside a prescribed optical path in the surface on the incidence side or on the emission side of the substrate.

In the above-described optical element manufacturing method of this invention, a process of machining a region outside a prescribed optical path is a process of forming a rough surface in the region.

In the above-described optical element manufacturing method of this invention, a process of machining a region outside a prescribed optical path is a process of machining this region to become an inclined surface with respect to the region within the prescribed optical path.

In the above-described optical element manufacturing method of this invention, a process of machining a region outside a prescribed optical path is a process of machining to form a groove with respect to this region.

In the above-described optical element manufacturing method of this invention, a process of machining a region outside a prescribed optical path is a process of forming an opening portion to open this region and the region within the prescribed optical path, such that this region is an inclined surface.

Prior to explaining specific aspects of this invention, first a summary of this invention is explained.

In this invention, an optical element is configured having one or more substrates transparent to incident light, each comprising a substrate transparent to incident light in which is embedded a lens of material with a refractive index higher than that of the substrate.

As a substrate transparent to incident light, if for example the incident light is visible light then an ordinary transparent substrate is used; if for example the incident light is in the ultraviolet region then a substrate which transmits light in the ultraviolet region is used; and if for example the incident light is in the infrared region then a substrate which transmits light in the infrared region is used.

As a lens substrate comprising a substrate transparent to incident light in which is embedded a lens of material with refractive index higher than that of the substrate, for example, a solid immersion lens (SIL) or similar is conceivable.

As the basic structure of the optical element of this invention, in addition to the structure of an ordinary solid immersion lens, for example, previously proposed structures (Japanese Patent Application No. 2000-132897, Japanese Patent Application No. 2000-189729, Japanese Patent Application No. 2000-189730, Japanese Patent Application No. 2000-305122, Japanese Patent Application No. 2001-37366, or Japanese Patent Application No. 2001-51736) can be adopted.

In this invention, shielding means to limit the optical path such that incident light propagates only within a prescribed optical path, by the action of either reflection, refraction, absorption, or dispersion, is provided on the incidence-side surface or on the emission-side surface of one substrate among the one or more substrates transparent to incident light in the above-described basic structure of the optical element.

Through this shielding means, a so-called aperture can be configured.

As a shielding means which employs reflection for shielding, for example, formation of a reflective film, or alteration of the surface outside the prescribed optical path to an inclined surface with respect to a surface (incidence surface or similar) within a prescribed optical path, are conceivable.

As a shielding means which employs refraction for shielding, for example, alteration of the surface outside the prescribed optical path to an inclined plane with respect to a surface (incidence surface or similar) within a prescribed optical path is conceivable.

As a shielding means which employs absorption for shielding, formation of an absorptive film is conceivable.

As a shielding means which employs dispersion for shielding, formation of a structure which causes dispersion of incident light on the surface outside the prescribed optical path is conceivable; for example, a rough surface may be formed, or a film with dispersive action may be formed.

By providing shielding means in this way, the optical path can be limited (shielded) such that incident light is not incident on unnecessary portions outside the prescribed optical path (for example, outside the effective region of the lens).

Hence the occurrence of stray light due to incidence of light on unnecessary portions can be prevented, and, for example, instability due to light returning to a semiconductor layer as well as noise and similar problems can be avoided.

Next, specific aspects of this invention are explained.

FIG. 1 is a cross-sectional view in summary of the configuration of major portions of an optical head using an optical element of this invention, as one aspect of this invention. This aspect is a solid immersion lens (SIL) comprising a first objective lens 11 and second objective lens 12 as objective lenses, and shows a case in which the shielding means, that is, the aperture, is formed on the surface on the light incidence side of the first objective lens 11.

The optical head shown in FIG. 1 comprises an optical element (lens element) 21 and a collimating lens 16; the optical element 21 comprises the above-described solid immersion lens consisting of a first objective lens 11 and second objective lens 12.

The first objective lens 11 is formed embedded in a first lens substrate 13; the second objective lens 12 is formed embedded in a second lens substrate 14.

The first and second objective lenses 11 and 12, and the first and second lens substrates 13 and 14, are all formed from material which is transparent to the incident light beam L.

Further, the first and second objective lenses 11 and 12 are formed from material having a higher refractive index than that of the first and second lens substrates 13 and 14.

In this aspect, an absorptive or reflective film 15 is formed in particular on the surface on the side on which light is incident on the first objective lens 11 of the optical element 21, that is, on the incidence-side surface of the first lens substrate 13 in which is embedded the first objective lens 11, to form an aperture.

The absorptive or reflective film 15 forming an aperture is an absorptive film formed from light-absorbing material or a reflective film formed from light-reflecting material.

As an absorptive film, for example, a layered film in which a dielectric film of silicon oxide or similar is formed to a prescribed thickness on top of a film of chromium or another metal, or a carbon film or other film with extremely low reflectivity, can be used.

As a reflective film, aluminum, gold, chromium, or another ordinary metal or similar can be used. Because there is no need for a particularly high reflectivity, tungsten or another material with low reflectivity may be used.

In the above-described aspect, by means of the absorptive or reflective film 15 formed on the incidence-side surface of the first lens substrate 13, a portion of the light in the optical path of the light beam L is absorbed or reflected, so that the optical path of the light beam L is limited, and operation as an aperture is achieved.

Figure 2:
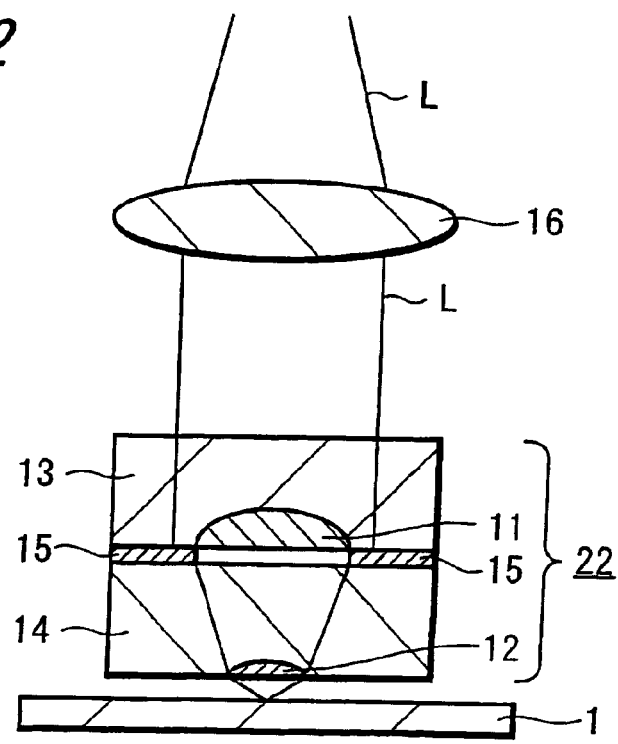
FIG. 2 is a cross-sectional view in summary of the configuration of major portions of an optical head using an optical element of this invention.

FIG. 2 is a cross-sectional view in summary of the configuration of major portions of another aspect of an optical head using an optical element of this invention.

An absorptive or reflective film 15 similar to that shown in FIG. 1 is formed, either on the light emission-side surface of the first lens substrate 13 in which is embedded the first objective lens 11 or on the light incidence-side surface of the second lens substrate 14 in which is embedded the second objective lens 12, to form the optical element (lens element) 22.

In this configuration also, similarly to FIG. 1, an aperture is formed by the absorptive or reflective film 15.

Similarly to the configuration of FIG. 1, this aspect can also operate as an aperture limiting the optical path of the light beam L, by absorbing or reflecting light in a portion of the optical path of the light beam L by means of the absorptive or reflective film 15 formed on either the light emission-side surface of the first lens substrate 13 or on the light incidence-side surface of the second lens substrate 14.

Figure 3:
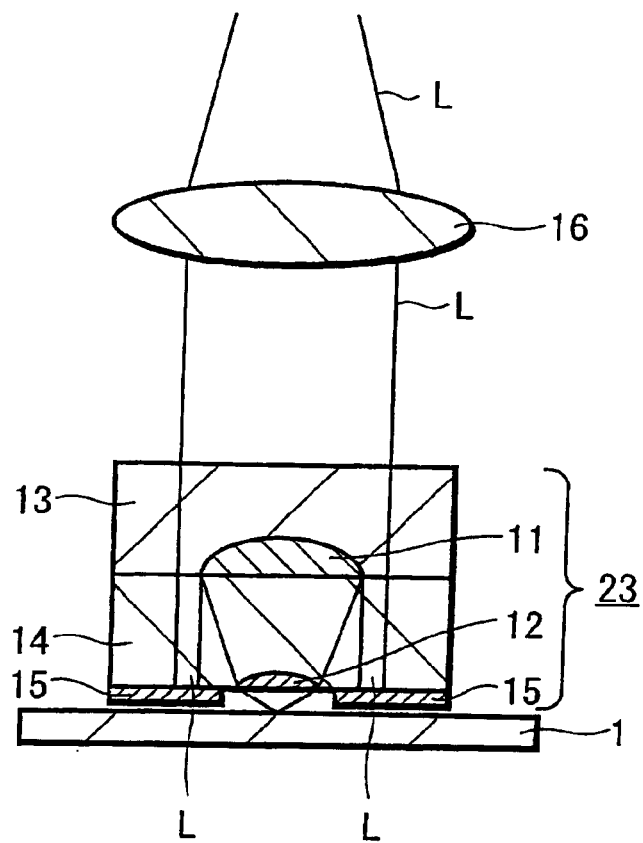
FIG. 3 is a cross-sectional view in summary of the configuration of major portions of an optical head using an optical element of this invention.

FIG. 3 is a cross-sectional view in summary of the configuration of major portions of another aspect of an optical head using an optical element of this invention.

An absorptive or reflective film 15 similar to that shown in FIG. 1 is formed on the light emission-side surface of the second lens substrate 14 in which is embedded the first objective lens 12, to form the optical element (lens element) 23.

In this configuration also, similarly to FIG. 1, an aperture is formed by the absorptive or reflective film 15.

In this case, the light beam L which has passed through the first objective lens 11 converges and is incident on the second objective lens 12; on the other hand, the light beam L passing outside the first objective lens 11 of the first lens substrate 13 does not converge but passes unchanged through the second lens substrate 14, and so this light is separated at the emission-side surface of the second lens substrate 14.

Consequently the absorptive or reflective film 15 need not be provided up to the very outer edge of the second objective lens 12, but may be provided at least in the range within which the light beam L passing through the outside of the objective lens 11 arrives.

Similarly to the configuration of FIG. 1, this aspect can also operate as an aperture limiting the optical path of the light beam L, by absorbing or reflecting light in a portion of the optical path of the light beam L by means of the absorptive or reflective film 15 formed on the emission-side surface of the second lens substrate 14.

Figure 4A:
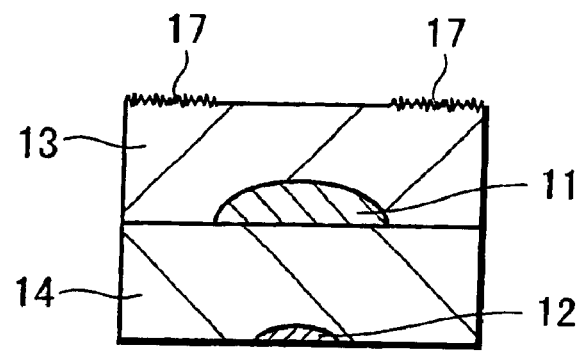
FIG. 4A to FIG. 4C are drawings showing optical elements in forms in which a rough surface is formed in the surface on the incidence side or on the emission side of the lens substrate.
Figure 4B:
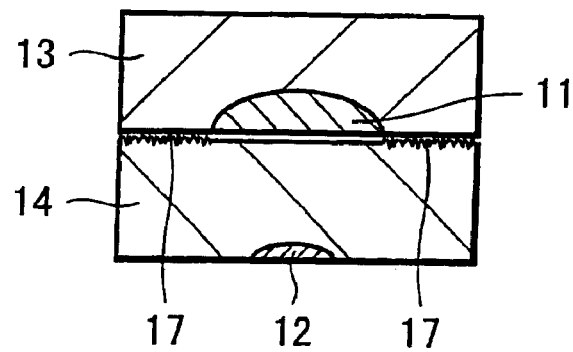
Figure 4C:
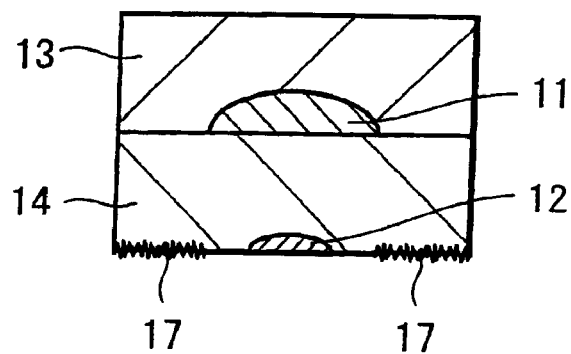

FIG. 4A to FIG. 4C are cross-sectional views showing still other aspects of an optical element of this invention.

In any of these aspects, shielding means, that is, an aperture, is formed by forming a rough surface 17 on the incidence-side or the emission-side surface of the lens substrate 13 or 14.

In the optical element (lens element) 24 of FIG. 4A, a rough surface 17 is formed on the light incidence-side surface of the first lens substrate 13 in which is embedded the first objective lens 11, to form an aperture.

In the optical element (lens element) 25 of FIG. 4B, a rough surface 17 is formed on the light incidence-side surface of the second lens substrate 14 in which is embedded the second objective lens 12, to form an aperture. Similar action is obtained even if the rough surface is formed on the light emission side of the first lens substrate 13 in which is embedded the first objective lens 11.

In the optical element (lens element) 26 of FIG. 4C, a rough surface 17 is formed on the light emission-side surface of the second lens substrate 14 in which is embedded the second objective lens 12, to form an aperture.

In the case of FIG. 4C, for the same reason as with the configuration of FIG. 3C, the rough surface 17 need not be provided up to the very outer edge of the second objective lens 12, but may be provided at least in the range within which the light beam L passing through the outside of the objective lens 11 arrives.

In these optical elements 24, 25 and 26, the rough surface 17 forming the aperture has the property of dispersing light, and so by dispersing the light of a portion of the optical path of light incident on the optical elements 24, 25 and 26, the optical path is limited, and the action of an aperture is obtained.

Figure 5:
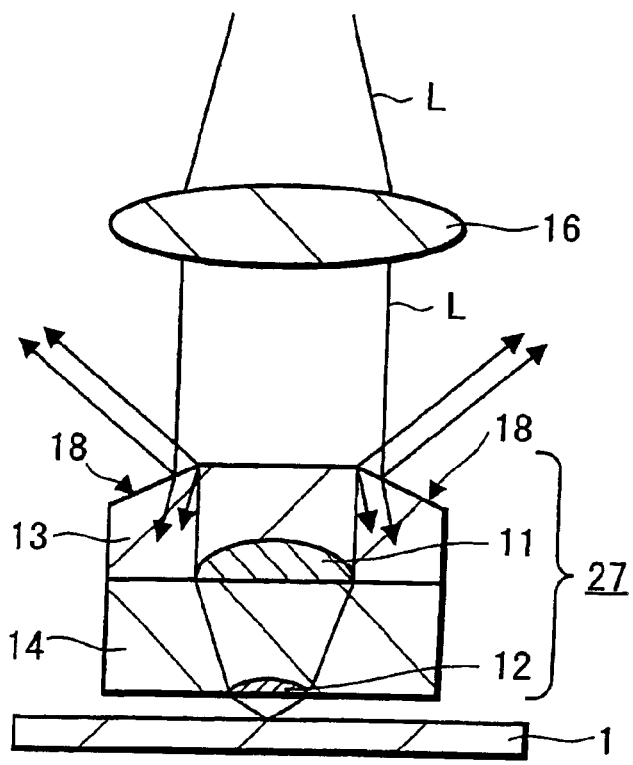
FIG. 5 is a cross-sectional view in summary of the configuration of major portions of an optical head using an optical element of this invention.

FIG. 5 is a cross-sectional view in summary of the configuration of major portions of another aspect of an optical head using an optical element of this invention.

By cutting the surface of the first lens substrate 13 on the light incidence side to obtain an inclined surface 18, an optical element (lens element) 27 in which is formed shielding means, that is, an aperture, is obtained.

In this optical element 27, the inclined surface 18 comprised by the aperture reflects or refracts light incident on the inclined surface 18. Consequently one portion of the light in the optical path of the light incident on the optical element 27 is reflected or refracted by the inclined surface 18 and is bent in a direction different from the direction of the original optical path, and by this means the optical path is limited, and action as an aperture is obtained.

Figure 6A:
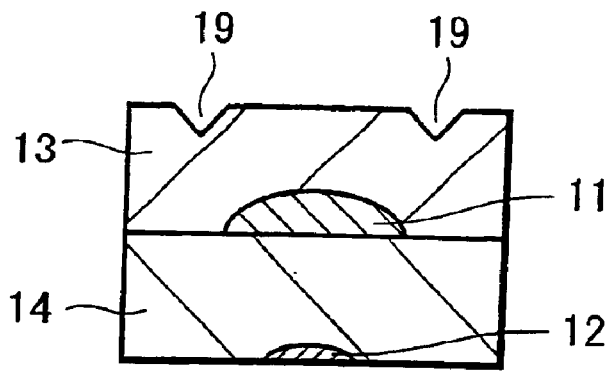
FIG. 6A to FIG. 6C are drawings showing forms of optical elements of this invention in which the light incidence-side surface of the first lens substrate is machined to form an aperture.
Figure 6B:
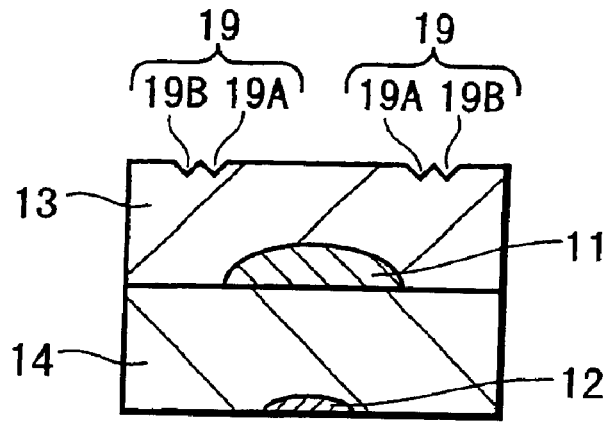
Figure 6C:
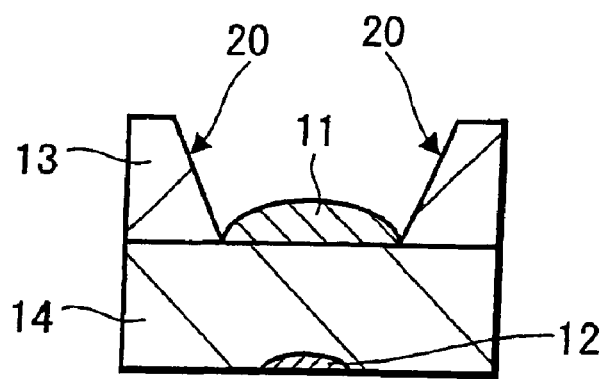

FIG. 6A to FIG. 6C are cross-sectional views showing still other aspects of an optical element of this invention.

In all aspects, the shielding means, that is, aperture, is configured by machining the light incidence-side surface of the first lens substrate 13.

In the optical element (lens element) 28 shown in FIG. 6A, the light incidence-side surface of the first lens substrate 13 is machined to form a V-shaped depression, that is, a groove 19, to form an aperture.

The V-shape groove 19 reflects or refracts light incident on the inclined surface. Consequently light in a portion of the optical path of the light incident on the optical element 28 is reflected or refracted by the side faces of the groove 19 and is bent in a direction different from the direction of the original optical path, so that the optical path is limited and the action of an aperture can be obtained.

In the optical element (lens element) 29 shown in FIG. 6B, the light incidence-side surface of the first lens substrate 13 is machined to form two V-shaped depressions, that is, the grooves 19 (19A, 19B), to form an aperture.

The two grooves 19A, 19B are formed as dual grooves such that, for example, the centers coincide according to the cross-sectional shape of the first objective lens 11. For example, if the cross-sectional shape of the first objective lens 11 is circular, a concentric circular shape is formed. Further, the two grooves 19A, 19B are formed continuously in the horizontal direction without opening an interval.

In this case also, a portion of the light in the optical path of the light incident on the optical element 29 is reflected or refracted by the side faces of the two grooves 19A, 19B, bending the light in a direction different from the direction of the original optical path and limiting the optical path, so that action as an aperture can be obtained.

In the optical element (lens element) 30 shown in FIG. 6C, an opening portion is formed by machining of the light incidence-side surface of the first lens substrate 13 with the side face shaped as an inclined surface 20, the first objective lens 11 with higher refractive index than the first lens substrate 13 is exposed, and an aperture is formed by the inclined surface 20 of the side face of the opening portion.

The inclined surface 20 of the side face of the opening portion refracts or reflects incident light. Consequently a portion of the light in the optical path of light incident on the optical element 30 is reflected or refracted by the inclined surface 20 and is bent in a direction different from the direction of the original optical path, so that the optical path is limited, and action as an aperture is obtained.

Figure 7A:
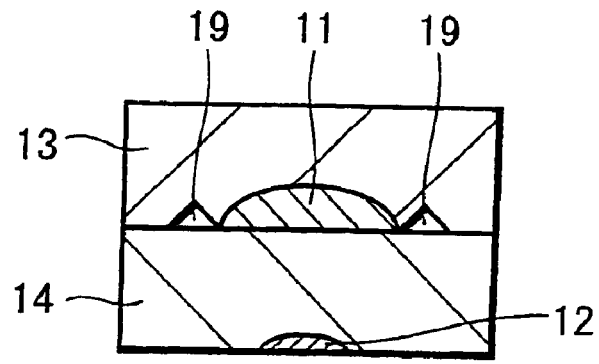
FIG. 7A to FIG. 7C are drawings showing forms of optical elements of this invention in which the light emission-side surface of the first lens substrate is machined to form an aperture.
Figure 7B:
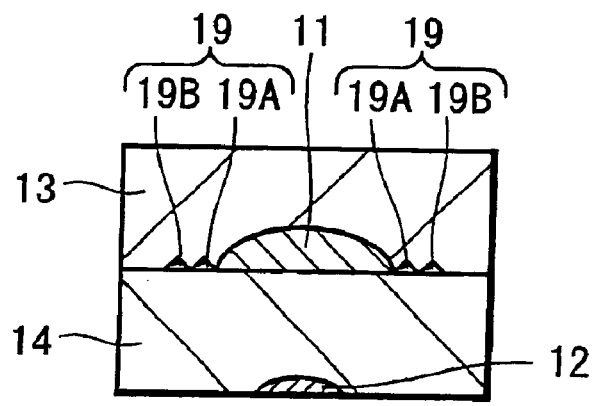
Figure 7C:
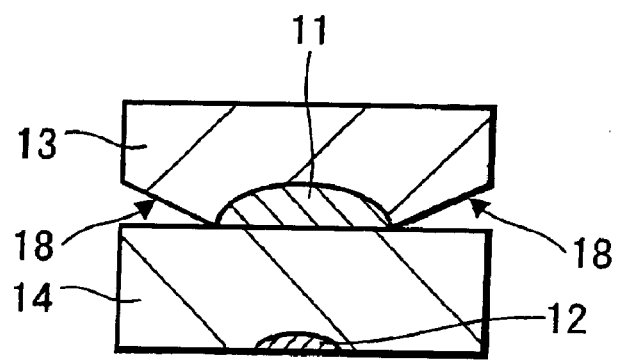

FIG. 7A to FIG. 7C are cross-sectional views showing still other aspects of an optical element of this invention.

In all aspects, the light emission-side surface of the first lens substrate 13 is machined to form shielding means, that is, an aperture.

In the optical element (lens element) 31 of the aspect shown in FIG. 7A, the light emission-side surface of the first lens substrate 13 is machined to form a V-shape groove 19, to form an aperture.

In this case also, similarly to the aspect shown in FIG. 6A, a portion of the light of the optical path of light incident on the optical element 31 is reflected or refracted by the side faces of the V-shape groove 19 and bent in a direction other than the direction of the original optical path, so that the optical path is limited, and action as an aperture can be obtained.

In the optical element (lens element) 32 of the aspect shown in FIG. 7B, the light emission-side surface of the first lens substrate 13 is machined to form two V-shape grooves 19 (19A, 19B), to form an aperture.

In this case also, similarly to the aspect shown in FIG. 6B, a portion of the light of the optical path of light incident on the optical element 32 is reflected or refracted by the side faces of the two V-shape grooves 19A and 19B and is bent in a direction other than the direction of the original optical path, so that the optical path is limited, and action as an aperture can be obtained.

In the optical element (lens element) 33 of the aspect shown in FIG. 7C, the light emission-side surface of the first lens substrate 13 is cut obliquely by machining into an inclined surface 18, and by means of this inclined surface 18 an aperture is formed.

In this case also, similarly to the optical element 27 shown in FIG. 5, a portion of the light in the optical path of the light incident on the optical element 33 is reflected or refracted by the inclined surface 18 and is bent in a direction other than the direction of the original optical path, so that the optical path is limited, and action as an aperture can be obtained.

FIG. 8A to FIG. 8D are cross-sectional views showing still other aspects of an optical element of this invention.

In all aspects, the light incidence-side surface of the second lens substrate 14 is machined to form shielding means, that is, an aperture.

Figure 8A:
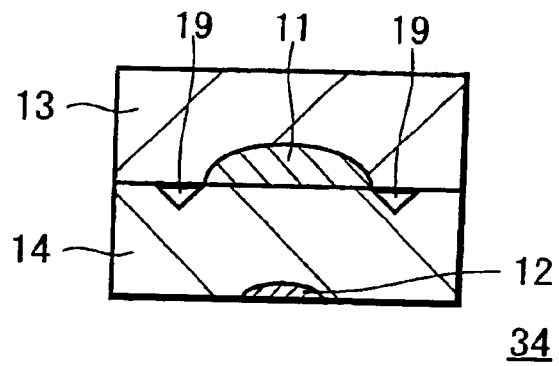
FIG. 8A to FIG. 8D are drawings showing forms of optical elements of this invention in which the light incidence-side surface of the second lens substrate is machined to form an aperture.

In the optical element (lens element) 34 of the aspect shown in FIG. 8A, the light incidence-side surface of the second lens substrate 14 is machined to form a V-shape groove 19, to form an aperture.

In this case also, similarly to the aspects shown in FIG. 6A and FIG. 7A, a portion of the light of the optical path of light incident on the optical element 34 is reflected or refracted by the side faces of the V-shape groove 19 and bent in a direction other than the direction of the original optical path, so that the optical path is limited, and action as an aperture can be obtained.

Figure 8B:
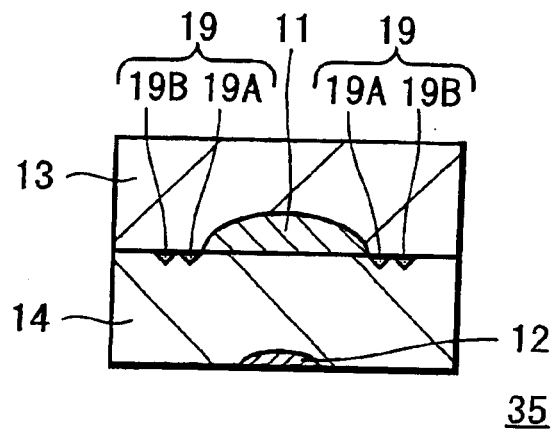

In the optical element (lens element) 35 of the aspect shown in FIG. 8B, the light incidence-side surface of the second lens substrate 14 is machined to form two V-shape grooves 19 (19A, 19B), to form an aperture.

In this case also, similarly to the aspects shown in FIG. 6B and FIG. 7B, a portion of the light of the optical path of light incident on the optical element 35 is reflected or refracted by the side faces of the two V-shape grooves 19A and 19B and is bent in a direction other than the direction of the original optical path, so that the optical path is limited, and action as an aperture can be obtained.

Figure 8C:
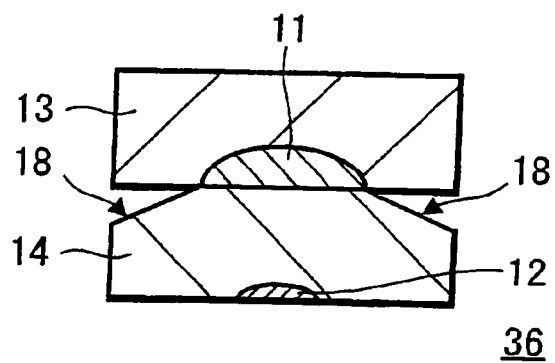

In the optical element (lens element) 36 of the aspect shown in FIG. 8C, the light incidence-side surface of the second lens substrate 14 is cut obliquely by machining into an inclined surface 18, and by means of this inclined surface 18 an aperture is formed.

In this case also, similarly to the aspect shown in FIG. 7C, a portion of the light in the optical path of the light incident on the optical element 36 is reflected or refracted by the inclined surface 18 and is bent in a direction other than the direction of the original optical path, so that the optical path is limited, and action as an aperture can be obtained.

Figure 8D:
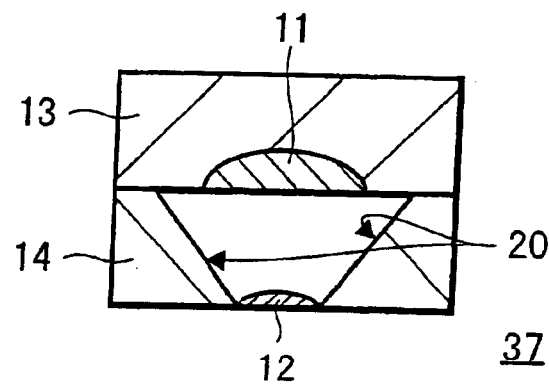

In the optical element (lens element) 37 shown in FIG. 8D, an opening portion is formed by machining of the light incidence-side surface of the second lens substrate 14 with the side face shaped as an inclined surface 20, the second objective lens 12 with higher refractive index than the second lens substrate 14 is exposed, and an aperture is formed by the inclined surface 20 of the side face of the opening portion.

In this case also, similarly to the aspect shown in FIG. 6C, the inclined surface 20 of the side face of the opening portion refracts or reflects a portion of the light of the optical path of light incident on the optical element 37, and the light is bent in a direction other than the direction of the original optical path, so that the optical path is limited, and action as an aperture can be obtained.

Figure 9A:
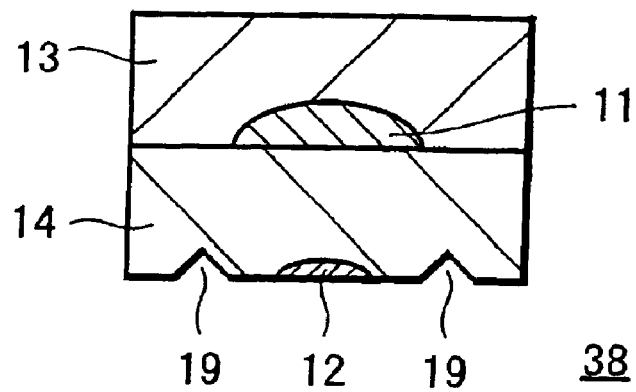
FIG. 9A to FIG. 9C are drawings showing forms of optical elements of this invention in which the light emission-side surface of the second lens substrate is machined to form an aperture.
Figure 9B:
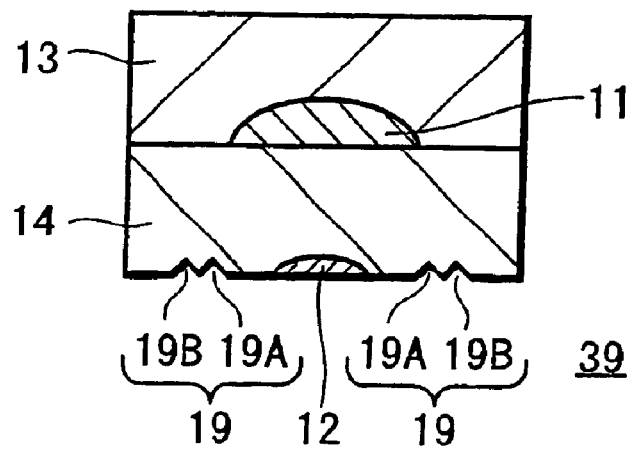
Figure 9C:
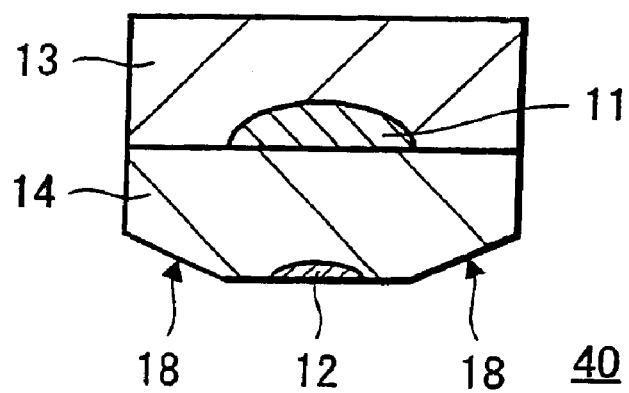

FIG. 9A to FIG. 9C are cross-sectional views showing still other aspects of an optical element of this invention.

In all aspects, the light emission-side surface of the second lens substrate 14 is machined to form shielding means, that is, an aperture.

In the optical element (lens element) 38 of the aspect shown in FIG. 9A, the light emission-side surface of the second lens substrate 14 is machined to form a V-shape groove 19, to form an aperture.

In this case also, similarly to the aspects shown in FIG. 6A, FIG. 7A and FIG. 8A, a portion of the light of the optical path of light incident on the optical element 38 is reflected or refracted by the side faces of the V-shape groove 19 and bent in a direction other than the direction of the original optical path, so that the optical path is limited, and action as an aperture can be obtained.

In the optical element (lens element) 39 of the aspect shown in FIG. 9B, the light emission-side surface of the second lens substrate 14 is machined to form two V-shape grooves 19 (19A, 19B), to form an aperture.

In this case also, similarly to the aspects shown in FIG. 6B, FIG. 7B and FIG. 8B, a portion of the light of the optical path of light incident on the optical element 39 is reflected or refracted by the side faces of the two V-shape grooves 19A and 19B and is bent in a direction other than the direction of the original optical path, so that the optical path is limited, and action as an aperture can be obtained.

In the optical element (lens element) 40 of the aspect shown in FIG. 9C, the light emission-side surface of the second lens substrate 14 is cut obliquely by machining into an inclined surface 18, and by means of this inclined surface 18 an aperture is formed.

In this case also, similarly to the aspects shown in FIGS. 7C and 8C, a portion of the light in the optical path of the light incident on the optical element 40 is reflected or refracted by the inclined surface 18 and is bent in a direction other than the direction of the original optical path, so that the optical path is limited, and action as an aperture can be obtained.

In place of forming an aperture by means of two grooves 19A and 19B as shown in FIGS. 6B, 7B, 8B and 9B, an aperture may be formed by forming three or more grooves continuously in the horizontal direction.

Next, a method of formation of an aperture by means of the absorptive or reflective film 15 shown in FIG. 1 to FIG. 3 is explained. FIG. 10 shows processes to manufacture an optical element comprising a first lens substrate 13 on the light incidence-side surface of which is formed an absorptive or reflective film 15, as shown in FIG. 1.

Figure 10A:
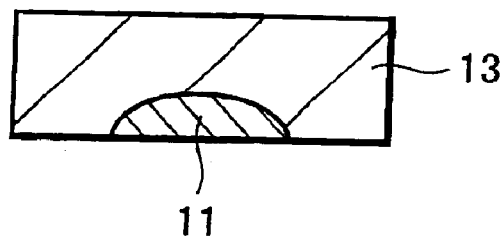
FIG. 10A to FIG. 10D are process diagrams showing processes to manufacture an optical element with the configuration of FIG. 1.

As shown in FIG. 10A, first a structure is formed in which there is embedded in a first lens substrate 13, comprising for example a dielectric material, a first objective lens 11 of material with a higher refractive index than the lens substrate 13.

Figure 10B:
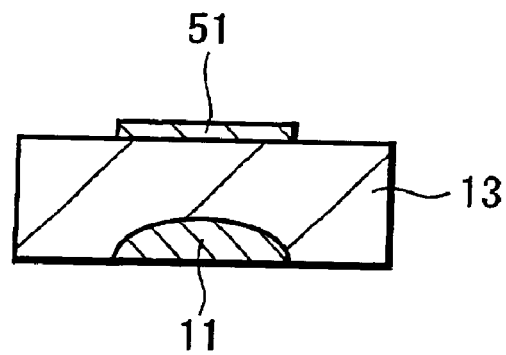

Next, as shown in FIG. 10B, an ordinary photoresist process is used to pattern and form a resist film 51 in the portion of the light incidence-side surface of the first lens substrate 13 through which light passes.

Figure 10C:
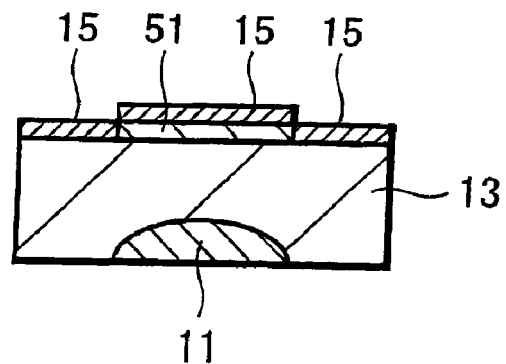

Next, as shown in FIG. 10C, ordinary sputtering or vacuum deposition methods are used to deposit an absorptive or reflective film 15 over the entire surface to a prescribed thickness.

As an absorptive film, for example, a layered film in which silicon oxide or another dielectric film is deposited to a prescribed thickness on top of chromium or another metal film, or a carbon or other film with an extremely low reflectivity, can be used.

As a reflective film, ordinary metal such as aluminum, gold, chromium or similar can be used. Because there is no need for a particularly high reflectivity, tungsten or another material with low reflectivity may be used.

Figure 10D:
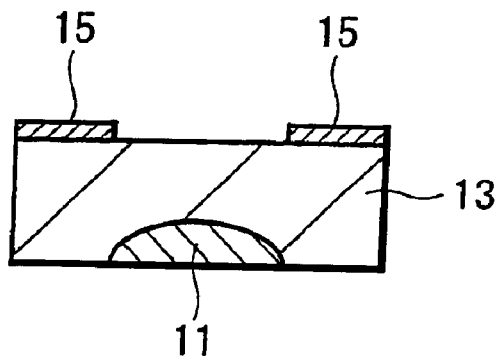

Finally, as shown in FIG. 10D, an ordinary lift-off method is used to remove the resist film 51 by immersion in acetone or another organic solvent or resist-stripping material, and in addition the absorptive or reflective film is also removed from on top of the resist film (the portion through which light passes).

In this way, an aperture comprising an absorptive or reflective film 15 is completed.

In the configurations shown in FIG. 2 and FIG. 3 also, similar manufacturing processes can be used to form an absorptive or reflective film 15 on the lens substrate 13 or 14, to manufacture an optical element having an aperture formed from an absorptive or reflective film 15.

Next, a method of forming an aperture using the portions which disperse light shown in FIG. 4, that is, the rough surface 17, is explained. FIG. 11 shows manufacturing processes for the configuration shown in FIG. 4A in which the rough surface 17 is formed on the light incidence-side surface of the first lens substrate 13.

Figure 11A:
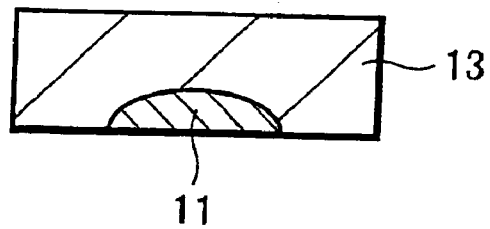
FIG. 11A to FIG. 11D are process diagrams showing processes to manufacture an optical element with the configuration of FIG. 4A.

As shown in FIG. 11A, first a structure is formed in which there is embedded in a first lens substrate 13, comprising for example a dielectric material, a first objective lens 11 of material with a higher refractive index than the lens substrate 13.

Figure 11B:
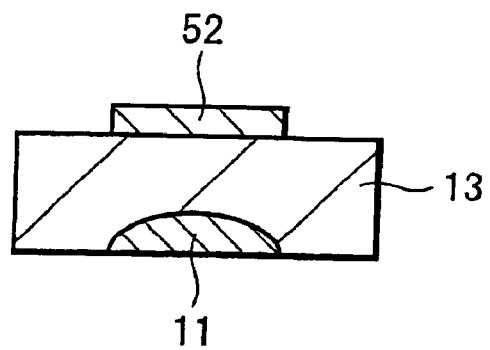

Next, as shown in FIG. 11B, an ordinary photoresist process is used to pattern and form a resist film (polyimide film) 52 in the portion of the light incidence-side surface of the first lens substrate 13 through which light passes.

Figure 11C:
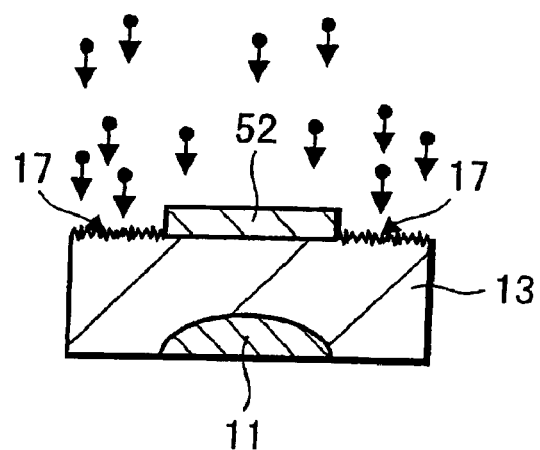

Next, as shown in FIG. 11C, an ordinary sandblasting method is used to form the rough surface 17 in the portion of the light incidence-side of the first lens substrate 13 not covered by the resist film 52.

Figure 11D:
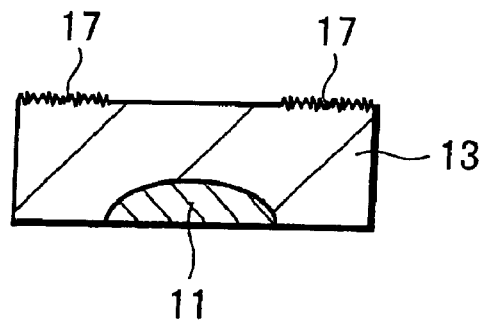

Finally, as shown in FIG. 11D, an ordinary lift-off method is used to remove the resist film 52 by immersion in acetone or another organic solvent or resist-stripping material.

In this way, an aperture formed by a rough surface 17 is completed.

The resist film 52 shown in FIG. 11B can use the same material or a different material from the material of the resist film 51 shown previously in FIG. 10B.

In the case of this FIG. 11, the sandblasting method results in considerable material removal, and so the resist film 52 is formed to a thickness which anticipates this removal.

In the cases of the configurations shown in FIG. 4B and FIG. 4C also, optical elements having an aperture formed by a rough surface 17 can be manufactured by using similar manufacturing processes to form a rough surface 17 on the lens substrate 13 or 14.

Next, a method of forming an aperture by means of a portion (an inclined surface 18, grooves 19, 19A, 19B, or the inclined surfaces 20 of the side faces of an opening portion) which bends the course of light utilizing the reflection or refraction of light as shown in FIG. 5 through FIG. 9. Of these, manufacturing processes for a configuration in which a V-shape groove 19 is formed on the light incidence-side surface of the first lens substrate 13 in FIG. 6A are shown in FIG. 12.

Figure 12A:
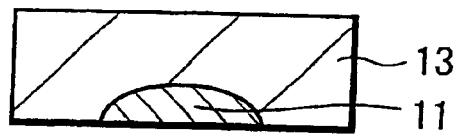
FIG. 12A to FIG. 12E are process diagrams showing processes to manufacture an optical element with the configuration of FIG. 6A.

As shown in FIG. 12A, first a structure is formed in which there is embedded in a first lens substrate 13, comprising for example a dielectric material, a first objective lens 11 of material with a higher refractive index than the lens substrate 13.

Figure 12B:
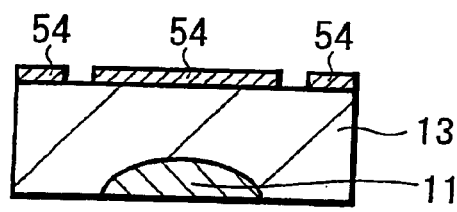

Next, as shown in FIG. 12B, an ordinary photoresist process is used to pattern and form a resist film 54 in the portion of the light incidence-side surface of the first lens substrate 13 excluding the portion in which a V-shape groove 19 is to be formed.

Figure 12C:
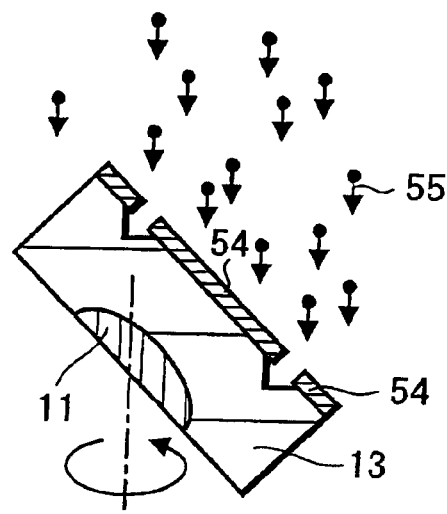
Figure 12D:
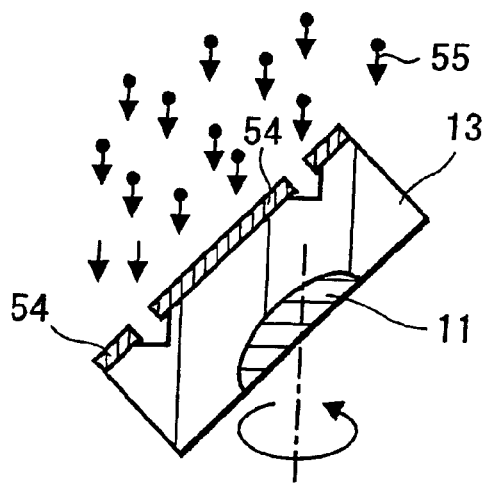

Next, as shown in FIG. 12C and FIG. 12D, an ordinary RIE (reactive ion etching) method or ion milling method is used to form a V-shape groove 19, by shaping the light incidence-side surface of the first lens substrate 13 using etching gas 55 or similar, with the resist film 54 employed as a mask. At this time, by inclining the substrate which is rotating during etching, the V-shape groove 19 can easily be formed.

Figure 12E:
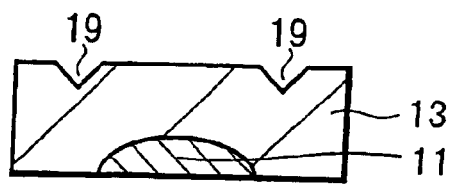

Finally, as shown in FIG. 12E, the resist film 54 is removed by a method such as immersion in acetone or another organic solvent or in a resist stripping agent.

In this way, an aperture consisting of a V-shape groove 19 is formed.

In the cases of the configurations shown in FIG. 7A, FIG. 8A and FIG. 9A also, similar manufacturing processes can be used to form a groove 19 on the lens substrate 13 or 14, to manufacture an optical element having an aperture formed from the groove 19.

In the case of formation in the lens substrate 13 or 14 of an aperture consisting of two grooves 19A, 19B also, an RIE method or ion milling method employing a mask can similarly be used to form the two grooves 19A and 19B.

In this case, a resist film or other mask is formed outside the portion in which the two grooves 19A, 19B are to be formed and in the center of the two grooves 19A, 19B, and an RIE or ion milling method is used for shaping until the mask in the center of the two grooves 19A, 19B is substantially removed.

In the case of formation in the lens substrate 13 or 14 of an inclined surface 18 by oblique cutting, either a method in which the surface of the lens substrate 13 or 14 is shaped from the same state as in FIG. 10A, or a method in which material to become a lens is embedded in a substrate 13 or 14 in a shape having an inclined surface 18 through mold-shapeing in advance using a mold, can be adopted.

As in the configurations shown in FIG. 6C and FIG. 8D, when an opening portion the side walls of which are inclined surfaces 20 is formed in a lens substrate 13 or 14, a method like the following can, for example, by adopted.

For example, a depression for embedding of a lens is formed in the lens substrate, and after forming a film of Al or similar on the inner surface of this depression to serve as an etching stopper, a lens of high-refractivity material is embedded in the lens substrate.

Then, a resist film or other mask is formed on the surface on the side on which the opening portion is to be formed, and similarly to FIG. 12, the lens substrate is inclined and an RIE method, ion milling method or similar is used to form the opening portion, the side face of which is the inclined surface 20. At this time, cutting of the lens is prevented by the film serving as the etching stopper. For example, an Al film acts as an etching stopper with respect to flon and other etching gases.

Thereafter, the etching stopper film and mask are removed. For example, an Al film can be removed using a KOH aqueous solution, an NaOH aqueous solution, phosphoric acid+water+acetic acid, and similar.

In the cases of the optical elements 31 to 40 of the above-described aspects, by forming an aperture on the light incidence-side or emission-side surface of the first or second lens substrate 13 or 14, an aperture very close to the optical elements 31 to 40 can be formed.

By this means, even when optical axis inclination occurs in the incident light beam L due for example to movement in the horizontal direction of the collimating lens 16, intrusion of the light beam L into unnecessary portions outside the effective area of the objective lenses 11, 12 can be prevented by the aperture (15, 17, 18, 19, 20); and, inhibition of guidance of the light beam L into the region within the effective area can be prevented.

Hence unstable oscillation, noise and similar problems due for example to light returning to a semiconductor laser, resulting from stray light intruding into unnecessary portions, can be avoided.

By using one of the optical elements 31 to 40 of the above-described aspects to form an optical pickup comprising a light source such as a semiconductor laser, a beam splitter to separate optical paths and other optical components, an optical pickup can be obtained in which noise is reduced and stable operation is achieved.

In each of the above-described aspects, this invention was applied to cases in which an objective lens was configured from two lenses, which are a first objective lens 11 and a second objective lens 12 embedded respectively in two lens substrates 13 and 14; but this invention can be applied to other configurations as well.

For example, even when an optical element comprises only one lens substrate in which an objective lens of material with a high refractive index is embedded in a substrate, this invention can similarly be applied, and shielding means, that is, an aperture, can be formed on the light incidence-side or emission-side surface of the lens substrate.

Figure 13:
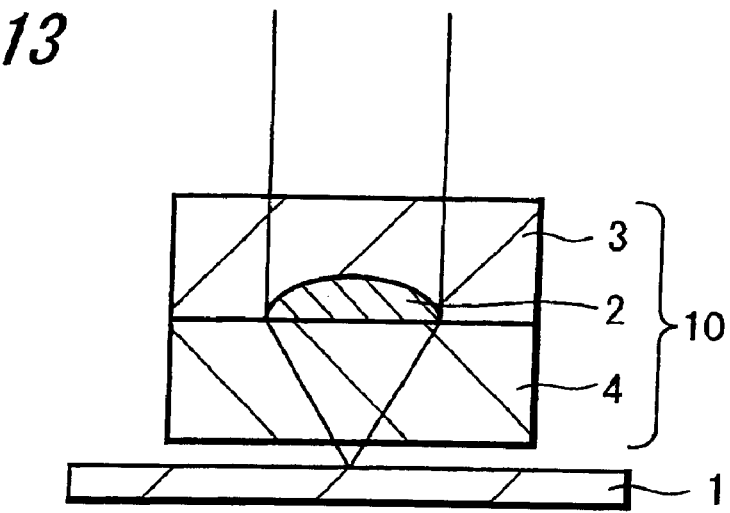
FIG. 13 is a cross-sectional view showing a form of an optical element configured from one objective lens; and, FIG. 14 is a cross-sectional view showing a conventional configuration of an optical head using an optical element comprising two lens substrates.
Figure 14:
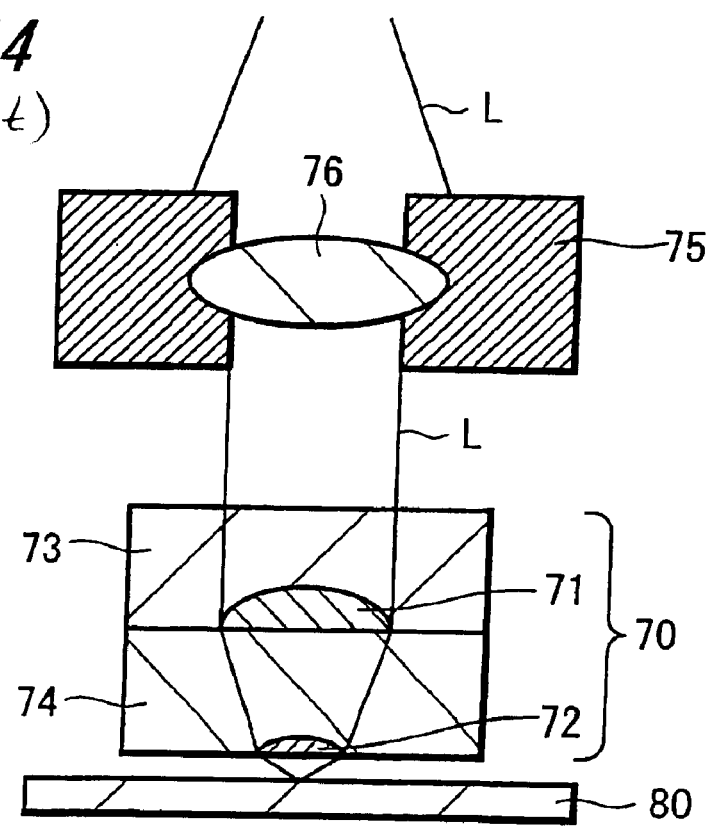

And as shown for example in FIG. 13, this invention can also be similarly applied to the case of an optical element (lens element) 10 in which two substrates 3, 4 are stacked, and an objective lens 2 of high-refractivity material is embedded in only one of the substrates 3.

In this case, not only can shielding means, that is, an aperture, be formed on the light incidence-side or emission-side surface of the substrate 3 in which is embedded the objective lens 2, but shielding means, that is, an aperture, can also be formed on the light incidence-side or emission-side surface of the substrate 4 in which no lens is embedded.

Also, as for example proposed in Japanese Patent Application No. 2000-132897, this invention can also be applied to a configuration in which still another lens is formed above a lens substrate in which is embedded a lens (a configuration in which there are one more lenses than there are substrates), and shielding means, that is, an aperture, can be formed on the light incidence-side or emission-side surface of a lens substrate.

This invention is not limited to the above-described aspects, and various other configurations can be adopted insofar as there is no deviation from the essence of this invention.

By means of the above-described invention, shielding means (an aperture) can be formed very close to an objective lens, so that even if for example inclination of the optical axis of incident light occurs, intrusion of light into unwanted portions can be prevented by the shielding means, and inhibition of guidance of light into the region within the effective area can be prevented.

Hence unstable oscillation, noise and similar problems due for example to light returning to a semiconductor laser, resulting from stray light intruding into unnecessary portions, can be avoided.

DESCRIPTION OF REFERENCE NUMERALS

1 OPTICAL DISC
11 FIRST OBJECTIVE LENS
12 SECOND OBJECTIVE LENS
13 FIRST LENS SUBSTRATE
14 SECOND LENS SUBSTRATE
15 ABSORPTIVE OR REFLECTIVE FILM
16 COLLIMATING LENS
17 ROUGH SURFACE
18, 20 INCLINED SURFACE
19A, 19B V-SHAPE GROOVE
20, 22, 23, 24, 25, 26, 27, 28, 29, 30, 31, 32, 33, 34, 35, 36, 37, 38, 39, 40, OPTICAL ELEMENT (LENS ELEMENT)
L LIGHT BEAM

What is claimed is:

1. An optical element, comprising:
   at least one substrate that is transparent to incident light, wherein said at least one substrate includes a lens substrate formed by embedding material having a refractive index higher than said at least one substrate, and wherein said at least one substrate includes a surface onto which light along a first optical path is incident or emitted; and
   a shielding element formed on the surface of the at least one substrate, wherein said shielding means limits the first optical path of the light incident or emitted onto the surface of the at least one substrate through reflection, refraction, absorption, or dispersion such that the incident or emitted light propagates only within a second optical path, and wherein the shielding element has a rough surface formed in a region outside the second optical path of the incident light.

2. The optical element according to claim 1, wherein the at least one substrate includes a plurality of stacked lens substrates.

3. A manufacturing method for optical elements, comprising the steps of:
   forming at least one substrate that is transparent to incident light, said at least one substrate having a surface that is one of a light incidence-side surface or a light emission-side surface;
   embedding a lens having a refractive index higher than said at least one substrate; and
   forming a region on the surface of the at least one substrate, wherein said region is outside a predetermined optical path of incident or emitted light, and wherein forming the region includes shaping or machining the region outside the predetermined optical path to produce a rough surface.

4. A manufacturing method for optical elements comprising the steps of:
   forming at least one substrate that is transparent to incident light, wherein a surface of said at least one substrate is one of a light incidence-side surface or an emission-side surface;
   embedding a lens having a refractive index higher than said at least one substrate; and
   forming a region on the surface of the at least one substrate, wherein said region is outside a predetermined optical path of incident or emitted light, and wherein forming the region includes machining the region to produce an inclined surface.

5. A manufacturing method for optical elements comprising the steps of:
   forming at least one substrate that is transparent to incident light, wherein a surface of the at least one substrate is a light incidence-side surface or a light emission-side surface;
   embedding a lens having a refractive index higher than said at least one substrate; and
   forming a region on the surface of the at least substrate, wherein said region is outside a predetermined optical path of incident or emitted light, and wherein forming the region includes cutting a groove in the region.

6. The manufacturing method of claim 3, wherein shaping includes a process of sandblasting.

* * * * *